United States Patent
Oh et al.

(10) Patent No.: US 12,473,396 B2
(45) Date of Patent: *Nov. 18, 2025

(54) TUFTED CARPET INCLUDING POLYETHYLENETEREPHTHALATE BULKED CONTINUOUS FILAMENT

(71) Applicant: HS HYOSUNG ADVANCED MATERIALS CORPORATION, Seoul (KR)

(72) Inventors: Seung Taek Oh, Seoul (KR); Moo Song Kim, Seoul (KR)

(73) Assignee: HS HYOSUNG ADVANCED MATERIALS CORPORATION, Seoul (KR)

( * ) Notice: Subject to any disclaimer, the term of this patent is extended or adjusted under 35 U.S.C. 154(b) by 30 days.

This patent is subject to a terminal disclaimer.

(21) Appl. No.: 18/173,323

(22) Filed: Feb. 23, 2023

(65) Prior Publication Data

US 2023/0192945 A1  Jun. 22, 2023

Related U.S. Application Data

(63) Continuation of application No. 16/271,834, filed on Feb. 10, 2019, now Pat. No. 11,634,536.

(30) Foreign Application Priority Data

Sep. 5, 2018 (KR) .................. 10-2018-0105803
Jan. 15, 2019 (KR) .................. 10-2019-0004935

(51) Int. Cl.
*C08G 63/183* (2006.01)
*B60N 3/04* (2006.01)
(Continued)

(52) U.S. Cl.
CPC ........... *C08G 63/183* (2013.01); *B60N 3/042* (2013.01); *C08G 63/80* (2013.01); *C08J 3/226* (2013.01);
(Continued)

(58) Field of Classification Search
None
See application file for complete search history.

(56) References Cited

U.S. PATENT DOCUMENTS 3,480,709 A  11/1969 Ingolf
3,859,042 A   1/1975 Dementi et al.
(Continued)

FOREIGN PATENT DOCUMENTS

CA    2628565 A1 *  6/2007
JP    1986-250034     11/1986
(Continued)

OTHER PUBLICATIONS

Sattler et al., Fibers, 5. Polyester Fibers, Ullmann's Encyclopedia of Industrial Chemistry, Publisher Wiley, p. 1-86, Oct. 15, 2011.*
(Continued)

*Primary Examiner* — Tae H Yoon
(74) *Attorney, Agent, or Firm* — Harness, Dickey & Pierce, P.L.C.

(57) ABSTRACT

A polyethylene terephthalate bulked continuous filament is manufactured by steps of melt-spinning, multi-step stretching a polyethylene terephthalate chip and a master batch chip for coloring, passing through a texturing nozzle, cooling, and winding and has an elastic modulus of 1.00E+07 to 5.00E+09Pa at a temperature range of 10° C. to 200° C., the filament being manufactured by steps of melt-spinning a polyethylene terephthalate chip and a master batch chip for coloring, multi-step stretching, passing through a texturing nozzle, cooling, and winding.

19 Claims, 5 Drawing Sheets (51) Int. Cl.
  *C08G 63/80* (2006.01)
  *C08J 3/22* (2006.01)
  *C08K 3/04* (2006.01)
  *D01F 1/04* (2006.01)
  *D01F 1/06* (2006.01)
  *D01F 6/62* (2006.01)
  *D02G 1/12* (2006.01)
  *D05C 17/02* (2006.01)
  *D06N 7/00* (2006.01)

(52) U.S. Cl.
  CPC ............... *C08K 3/04* (2013.01); *D01F 1/04* (2013.01); *D01F 1/06* (2013.01); *D01F 6/62* (2013.01); *D02G 1/122* (2013.01); *D05C 17/026* (2013.01); *D06N 7/0065* (2013.01); *D10B 2331/04* (2013.01); *D10B 2503/04* (2013.01); *D10B 2505/12* (2013.01)

(56) References Cited

U.S. PATENT DOCUMENTS

| | | | |
|---|---|---|---|
| 4,113,821 A | 9/1978 | Russell et al. | |
| 6,284,370 B1 | 9/2001 | Fujimoto et al. | |
| 11,634,536 B2 * | 4/2023 | Oh | C08G 63/80 428/369 |
| 2008/0292831 A1 | 11/2008 | Juriga et al. | |
| 2012/0064281 A1 * | 3/2012 | Taylor | D04H 3/007 428/95 |
| 2012/0282431 A1 | 11/2012 | Chang et al. | |

FOREIGN PATENT DOCUMENTS

| | | |
|---|---|---|
| JP | 2007-224705 A | 9/2007 |
| JP | 2010-116630 A | 5/2010 |
| KR | 10-0687047 B1 | 2/2007 |
| KR | 10-2012-0012291 A | 2/2012 |
| WO | WO 2008/061087 A1 * | 5/2008 |
| WO | WO-2009/150681 A1 | 12/2009 |
| WO | WO-2010/107762 A1 | 9/2010 |
| WO | WO-2018/135714 A2 | 7/2018 |

OTHER PUBLICATIONS

Farah et al., Morphological, spectral and chromatography analysis and forensic comparison of PET fibers, Talanta, vol. 214, Elsevier publisher, Feb. 5, 2014, p. 54-62.*
1-page Merriam-Webster Dictionary for Emulsion, downloaded on May 16, 2024.*
7 page article, The effect of temperature on the value on Young's modulus class 11 physicas CBSE, downloaded on Oct. 9, 2021.
Office Action (Non-Final) from corresponding U.S. Appl. No. 16/271,934, dated Oct. 15, 2021.
Office Action (Non-Final) from corresponding U.S. Appl. No. 16/271,934, dated Mar. 12, 2021.
Office Action (Final) from corresponding U.S. Appl. No. 16/271,934, dated Jan. 28, 2022.
Office Action (Final) from corresponding U.S. Appl. No. 16/271,934, dated Jun. 24, 2021.
Notice of Allowance from corresponding U.S. Appl. No. 16/271,834, dated Dec. 19, 2022.

* cited by examiner

TUFTED CARPET INCLUDING POLYETHYLENETEREPHTHALATE BULKED CONTINUOUS FILAMENT

CROSS-REFERENCE TO RELATED APPLICATIONS

This application is a continuation application of U.S. application Ser. No. 16/271,834, now U.S. Pat. No. 11,634,536, filed on 10 Feb. 2019, which claims the benefit of priority based on Korean Patent Application Nos. 10-2018-0105803 filed on Sep. 5, 2018, and 10-2019-0004935, filed on Jan. 15, 2019, which are incorporated herein by reference in their entirety.

FIELD

The present invention relates to a polyethylene terephthalate bulked continuous filament having an excellent elastic recovery rate, and an automotive tufted carpet including the same.

BACKGROUND

Generally, a carpet tufted carpet for automobiles is subjected to pressure, such as a user's stepping on by the foot continuously. In particular, the elastic recovery rate is the most important property of the carpet because the carpet is subjected to a high-temperature and high-pressure process in the process of molding the same shape as the floor to be attached to the vehicle floor.

Nylon 6, nylon 66, polypropylene, polyethylene terephthalate and the like are typically used as the synthetic fiber materials of the bulked continuous filament (BCF) which is the material of the automobile carpet. Among them, nylon is the best material for automotive carpets, but low cost polypropylene is used as a substitute because of its high price.

On the other hand, synthetic fibers have been applied to carpet fibers for a short period of time and deep studies thereon are not sufficient and industrial development is slow. Accordingly, when producing synthetic fibers applicable to carpets such as polyethylene terephthalate or nylon, the polymerizations are prepared similarly to the conventional methods, and then the product is subjected to a spinning process and the existing fiber properties such as strength and elongation are applied.

In addition, polyethylene terephthalate (PET) has been known to be unsuitable for producing carpets due to inherent physical properties of polymers having a lower elastic recovery than nylon.

Figure 1:
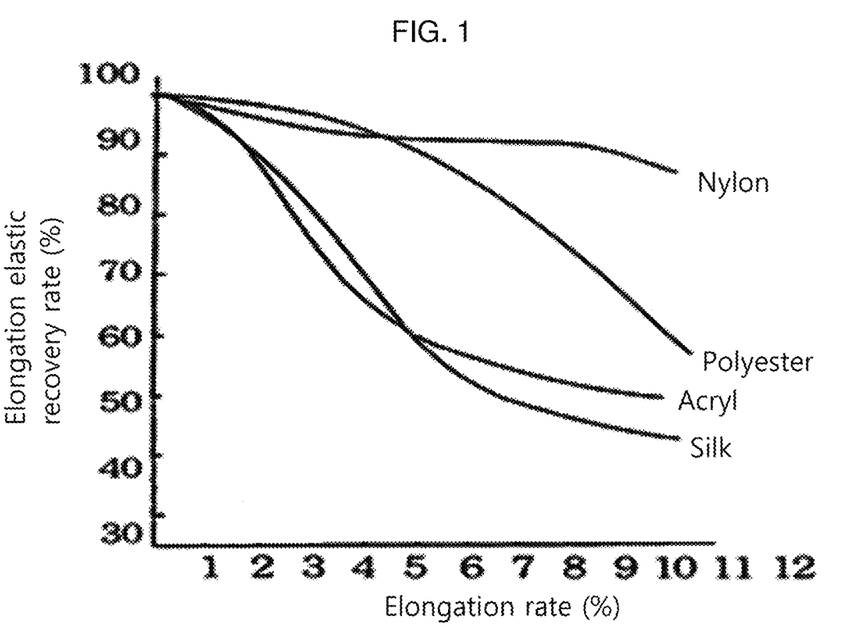
FIG. 1 is a graph showing elongation elasticity recovery rates according to elongation rates of synthetic fibers.

Specifically, nylon has the strongest secondary bond (hydrogen bond) between polymer chains, while polyethylene terephthalate polymer has van der Waals force and dipole-dipole force, which are relatively weak secondary bonds, between the chains. Thus, as shown in FIG. 1, when a strain is applied, the elastic recovery rate of the nylon fiber is maintained to some extent even if the elongation percentage is increased. However, the polyethylene terephthalate fiber is continuously reduced in the elastic recovery rate.

Accordingly, for the purpose of increasing the elastic recovery rate of the polyethylene terephthalate fiber, when preparing a polyethylene terephthalate polymer such as nylon in order to increase the hydrogen bonding force, amines, which are raw materials of nylon, are added together to prepare a copolymer having an ester-amide group. In addition, there is a method of manufacturing a carpet by using the polymeric compound such as polytrimethylene terephthalate (PTT) or polybutylene terephthalate (PBT), which is known to have a high elastic recovery rate.

In addition, the thermal properties of the polymer are also important, especially in the case of automotive tufted carpets because it involves heating and pressing at a high pressure of around 200° C. to form the same shape as the vehicle floor.

On the other hand, when polyethylene terephthalate is copolymerized with amines, the melting temperature is lowered and thermal properties are lowered. Therefore, after heating, the bulked continuous filaments are distorted and cannot serve as carpets for automobiles. Polymers such as PTT and PBT are not suitable for manufacturing carpets for automobiles because they have a melting point by 20 to 30° C. lower than polyethylene terephthalate. In other words, in order to manufacture filaments for carpets for automobiles, besides basic properties such as strength and elongation, inherent properties such as elastic recovery ratio should be considered, and other properties such as melting temperature and glass transition temperature should also be considered together.

In addition, the molecular weight of conventional polyethylene terephthalate medical fibers is in the range of 35,000 to 45,000 on the basis of the weight average molecular weight. When a bulked continuous filament having the same molecular weight is produced and subjected to a carpet thermoforming process, the physical properties the filament, which is an upper pile of the carpet, are insufficient, thereby being damaged. These damages can only keep the original planting height as high as 20-30% of the height of the pile, and the cushion feeling and the volume feeling of the carpet are significantly lowered, and the pressing mark and the color feeling are also deteriorated. In addition, when low molecular weight substances having a lower molecular weight than a critical molecular weight (Mc) increase due to a broad molecular weight distribution of the polymer (PDI), it causes pyrolysis in the spinning process, thereby making the physical properties of the fibers deteriorated.

SUMMARY

Technical Problem

It is an object of the present invention to provide a polyethylene terephthalate bulked continuous filament having improved an elastic recovery rate and a method for producing the same.

It is also an object of the present invention to provide a carpet for automobiles having a cushioning feeling, a volume feeling and a color feeling, such as a car mat made of nylon bulked continuous filaments including the polyethylene terephthalate bulked continuous filaments.

Technical Solution

According to an aspect of the present invention, there is provided a polyethylene terephthalate bulked continuous filament having an elastic modulus of 1.00E+07 to 5.00E+09Pa at a temperature range of 10° C. to 200° C., the filament being manufactured by steps of melt-spinning a polyethylene terephthalate chip and a master batch chip for coloring, multi-step stretching, passing through a texturing nozzle, cooling, and winding.

Herein, (a) a weight average molecular weight of the filament may be 50,000 to 70,000, (b) a molecular weight distribution (PDI) of the filament may be 1.6 to 2.0; (c) a carboxyl end group (CEG) content of the filament may be equal to or less than 20 meq/kg, and (d) a diethylene glycol (DEG) content of the filament may be equal to or less than 1.5 wt %.

Further, the filament may include 1 to 8 wt % of the master batch chip for coloring based on a total weight of the filament.

Further, a polymer of the master batch chip for coloring may have (a) a weight average molecular weight of 30,000 to 70,000, (b) a molecular weight distribution (PDI) of 1.0 to 2.0, and (C) a diethylene glycol (DEG) content of 1.5 wt % or less.

Herein, a content of low molecular weight substances having a weight average molecular weight of 8,000 or less in a polymer of the master batch chip for coloring may be 10% by weight or less, preferably 5 wt % or less.

Further, a polymer of the master batch chip for coloring may have a total content of terephthalic acid, monohydroxyethyl terephthalate and bis(2-hydroxyethyl terephthalate of 150 ppm or less.

Further, the master batch chip may be prepared by solid phase polymerization.

Further, a weight average molecular weight of the master batch chip for coloring may be 80% to 120% of a weight average molecular weight of the polyethylene terephthalate bulked continuous filament.

Further, the master batch chip for coloring may include carbon black as a dye in an amount of 1 to 40 wt % based on a total weight of the master batch chip for coloring.

According to another aspect of the present invention, there is provided a tufted carpet for automobiles, the tufted carpet including: a pile layer including the polyethylene terephthalate bulked continuous filament of any one of claims 1 to 5; and at least one backing layer, wherein an elastic recovery rate, which is a height of the pile layer after thermoforming to a height of the pile layer before thermoforming, is equal to or greater than 35%.

Herein, the bulked continuous filament may have a fineness of 700 to 1500 denier.

Further, the pile layer may weigh 180 gsm to 700 gsm.

Advantageous Effects

The polyethylene terephthalate bulked continuous filament according to embodiments of the present invention has a weight average molecular weight higher than that of the conventional filament, a narrow molecular weight distribution, and a reduced content of carboxyl terminal groups which cause pyrolysis, so that the elasticity recovery rate can be improved.

Further, by manufacturing such a carpet for automobiles by using polyethylene terephthalate bulked continuous filaments, the qualities such as volume feeling and cushion feeling can be improved.

DETAILED DESCRIPTION

The present invention is capable of various modifications and various forms, and specific examples are described in detail in the following description. It should be understood, however, that the invention is not intended to be limited to the particular forms disclosed, but on the contrary, is intended to cover all modifications, equivalents, and alternatives falling within the spirit and scope of the invention.

In this application, the terms "include" or "having", etc., are used to specify that there is a feature, figure, step, operation, element, part or combination thereof which is stated in the specification, and that it should not be construed to preclude the presence or addition of one or more other features, integers, steps, operations, components, parts, or combinations thereof. Also, when a part such as a layer, film, region, plate, or the like is referred to as being "on" another part, this includes not only the case where it is "directly over" another part, but also a case where there is another part therebetween. On the contrary, when a part such as a layer, film, region, plate or the like is referred to as being "under" another part, it includes not only the case where it is "directly under" another part, but also the case where there is another part in the middle.

Hereinafter, examples of the present invention will be described in detail.

Figure 2:
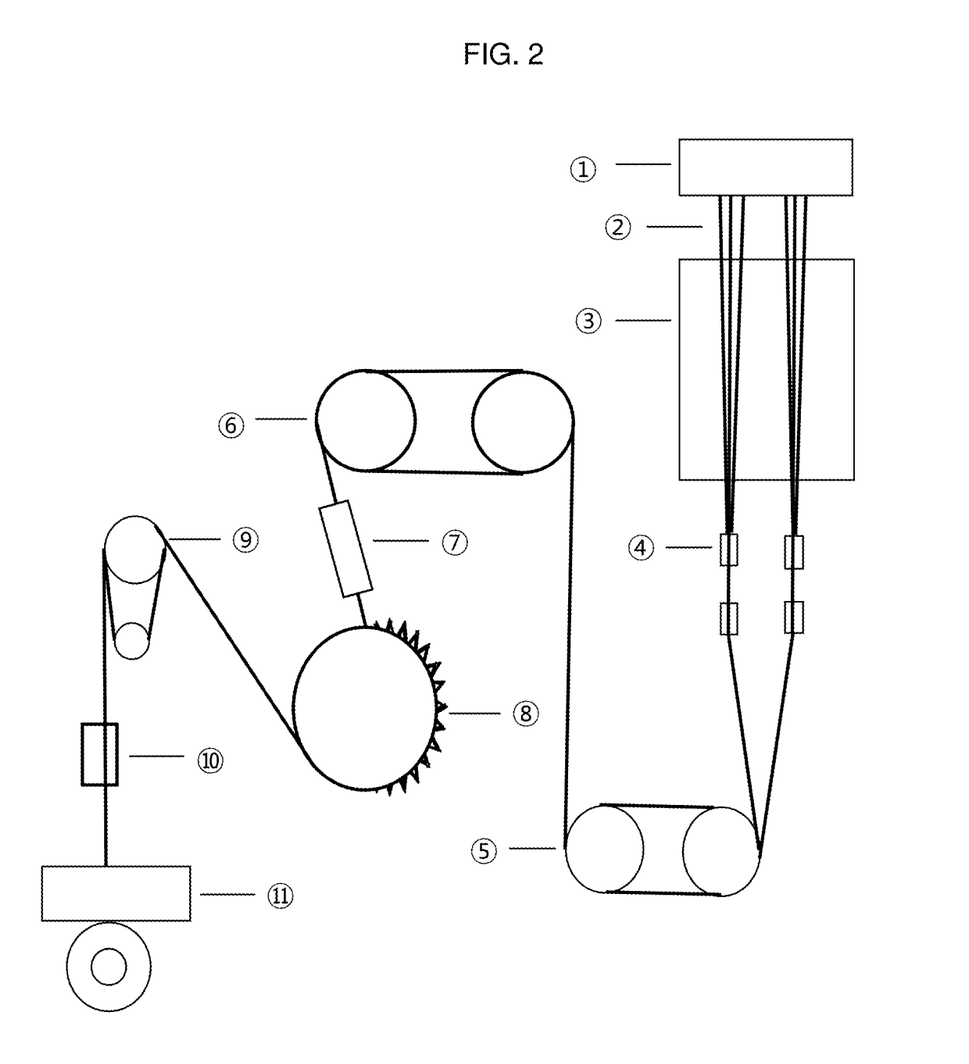
FIG. 2 is a schematic view of an apparatus for producing polyethylene terephthalate bulked continuous filaments according to an example of the present invention.

Hereinafter, a method for producing a polyethylene terephthalate bulked continuous filament according to an example of the present invention will be described with reference to the drawings. FIG. 2 is a schematic view of an apparatus for producing polyethylene terephthalate bulked continuous filaments according to an example of the present invention.

A method of producing polyethylene terephthalate bulked continuous filaments according to an example may include melt spinning a polyethylene terephthalate chip. At this time, the step of melt-spinning may be a step of melt-spinning the polyethyleneterephthalate chip and the coloring master batch chip together.

Generally, yarns are fabricated and then subjected to salt processing. However, since the carpet is not easily dyed after fabrication, a certain amount of master batching chips for coloring is injected for the amount of base chips in the supply of raw materials, to thereby produce a dope-dyed yarn.

Generally, a master batch chip is produced by injecting a large amount of carbon black or a dye together with a base chip and extruding it. At this time, in order to dissolve the chips and increase the dispersibility of carbon black or dye, high heat and high shearing force are applied in the extruder. As a result, the base chip is thermally decomposed and the chain in the polymer is broken, and the molecular weight is greatly reduced to less than half.

Meanwhile, in the case of polyethylene terephthalate in polymer engineering, a weight average molecular weight (Mw) of 8,000 or a number average molecular weight (Mn) of 3,500 is a critical molecular weight, and low molecular materials having a molecular weight lower than the critical molecular weight have low mechanical properties and properties of the polymer are inhibited because a chemical reaction such as pyrolysis occurs easily during processing.

As a result, when the master batch is produced, thermal oxidation decomposition, hydrolysis, and the like occur, a large amount of low molecular weight substances having a critical molecular weight or less is contained in the final master batch. When such a master batch is applied to spinning, it becomes difficult to exhibit excellent physical properties of the bulky continuous filaments.

Accordingly, in the present invention, a master batch in which a low molecular weight substance having a critical molecular weight or less is removed by increasing the molecular weight of a master batch polymer having a low molecular weight by solid phase addition is applied.

At this time, a carbon black master batch for coloring a fiber usually contains 1 to 40% of carbon black, and is different from the solid-state polymerization conditions of general polyethylene terephthalate (PET) chips. Since carbon black acts as a crystal nucleus in the master batch and accelerates the crystallization rate of the polymer, the crystallization process required in the solid phase polymerization process of the general PET chip is not necessary, and a polymerization reaction is induced by raising a temperature at which the solid phase polymerization.

On the other hand, the master batch chip is easily melted as it approaches a melting temperature since the degree of polymerization of the masterbatch is much lower than that of general chips. Since this may lead to contamination of the solid phase polymerizer due to carbon black, the polymerization reaction should proceed at a somewhat lower temperature than the normal solid phase polymerization temperature.

Meanwhile, a content of low molecular weight substances having a weight average molecular weight (Mw) of 8,000 or less, which is the critical molecular weight in the master batch, is preferably 10 wt % or less, more preferably 5 wt % or less, further preferably 1 wt % or less, even more preferably 0.5 wt %

Also, a total content of terephthalic acid (TPA), monohydroxyethyl terephthalate and bis (2-hydroxyethyl terephthalate) in the master batch is preferably 150 ppm or less, more preferably 75 ppm or less and even more preferably 20 ppm or less.

At this time, it is preferable that the weight average molecular weight of the master batch polymer that has completed the solid phase polymerization is preferably 30,000 to 70,000, more preferably 45,000 to 70,000, even more preferably 50,000 to 70,000. At this time, the weight average molecular weight of the master batch is preferably similar to the weight average molecular weight of the polyethylene terephthalate bulked continuous filament. Specifically, the weight average molecular weight of the master batch may be 80 to 120%, more preferably 90 to 110%, and even more preferably 95 to 105% of the weight average molecular weight of the polyethylene terephthalate bulked continuous filament.

In addition, the molecular weight distribution (Poly Dispersity Index, PDI) of the master batch polymer is preferably 1.0 to 2.0. In addition, the content of diethylene glycol (DEG) which is a cause of deterioration of the properties of the yarn is preferably 1.5 wt % or less. In this case, the problem of deterioration of the physical properties of the fiber during the spinning process can be prevented. Further, examples of dyes usable in the master batch chip may be inorganic dyes such as carbon black or organic dyes, but carbon black is preferably used.

At this time, the average particle diameter of the carbon black particles may be 10 to 25 nm, but the present invention is not limited to this example. When the average particle diameter of the carbon black particles is less than 10 nm, the dispersibility is lowered, the yield is lowered in the master-batch manufacturing process, the uniform dispersion cannot be achieved, and thus the color of the manufactured original yarn may be uneven. When the average particle diameter of the carbon black particles is more than 25 nm, many truncations may occur in the production of the dope-dyed yarn.

Further, the organic dye may be at least one selected from the group consisting of a monoazo dye, a disazo dye, an anthraquinone dye, a triarylmethane dye, and an azine dye.

Such a dye may be from 1 to 40 wt %, and preferably from 10 to 30 wt %, based on the total weight of the master batch chip. When the content of the dye is less than 1 wt %, a large amount of master batch chips should be added in order to obtain a desired degree of blackness, which is disadvantageous in terms of the strength development of the dope-dyed yarn and increases dope-dyeing costs. Further, when the content of the dye exceeds 40 wt %, the preparation of the master batch chip becomes difficult, and it is difficult to ensure uniform dispersibility.

In addition, the master batch chip is preferably contained by an amount of 1 to 8 wt %, more preferably 3 to 5 wt %, based on the total weight of the final filament. If the content of the master batch chip in the filament is less than 1 wt %, it is difficult to exhibit sufficient blackness of the dope-dyed yarn. If the content is more than 8 wt %, yarn truncation may increase and spinnability may deteriorate.

Further, the polyethylene terephthalate chip is preferably prepared by liquid phase polymerization or solid phase polymerization. At this time, it is preferable to use a batch or continuous polymerization method for the solid phase polymerization, but the present invention is not limited to this example. More specifically, the solid phase polymerization is carried out under vacuum conditions at 110 to 170° C. for 4 to 6 hours to remove moisture, and the temperature is raised from 235 to 255° C. for 4 to 6 hours, and the solid phase polymerization time is preferably 20 to 30 hours.

As described above, the liquid phase polymerization or solid phase polymerized polyethylene terephthalate chips are melt-spun at 245-335° C. and passed through a spinneret 1.

The polyethylene terephthalate resin that is the basis of the present invention preferably contains at least 90 mol % of repeating units of ethylene terephthalate.

Alternatively, the polyethylene terephthalate may include a small amount of units derived from ethylene glycol and terephthalenedicarboxylic acid or derivatives thereof and one or more ester-forming components as copolymer units. Examples of other ester forming components copolymerizable with the polyethylene terephthalate unit include glycols such as 1,3-propanediol, 1,4-butanediol, 1,6-hexanediol and the like, and dicarboxylic acid such as terephthalic acid, isophthalic acid, hexahydroterephthalic acid, stilbene dicarboxylic acid, bibenzoic acid, adipic acid, sebacic acid, and azelaic acid.

The fineness of the polyethylene terephthalate yarn thus produced is preferably 700 to 1500 denier and more preferably 850 to 1350 denier. The diameter of the polyethylene terephthalate yarn is preferably 6 to 20 dpf, more preferably 10 to 15 dpf.

When the fineness of the yarn is less than 700 denier and the diameter is less than 6 dpf, the uprightness of the fabric pile is lowered when the carpet is formed, resulting in poor abrasion resistance, molding restorability and appearance, and when the fineness exceeds 1500 denier or the diameter exceeds 20 dpf, the density of the carpet fabric is lowered, resulting in poor abrasion resistance and restoring force.

Thereafter, the step of cooling the spun polyethylene terephthalate yarn may be performed. At this time, the cooling step may be a step of cooling the yarn at the cooling zone 3 with air at a speed of 0.2 to 1.0 m/sec. The cooling temperature is preferably adjusted to 10 to 30° C., and if the cooling temperature is less than 10° C., it is disadvantageous from the economical point of view. If the cooling air speed is less than 0.2 m/sec, the cooling effect is insufficient. If the cooling air speed is more than 1.0 m/sec, the shaking of the yarn is excessive, which will cause a problem in the spinning workability, and thus it is preferable that the speed of the cooling air is 0.2 to 1.0 m/sec.

After the cooling, a spin finish step of performing oiling is carried out. In a finishing applicator 4, oil is firstly and secondarily lubricated by using a neat type emulsion or a water-soluble emulsion, thereby increasing rolling speed, lubricity and smoothness of the yarn.

Thereafter, the filament is fed to a stretching roller 6 at a speed of 300 to 1,200 m/min, preferably 500 to 800 m/min, on the feed roller 5. At this time, the stretching roller 6 is stretched at a temperature of 140 to 240° C. at a speed of 2.0 to 5.0 times the feed roller 5 speed, preferably 2.5 to 4.5 times. If the stretching speed is less than 2.0 times, the stretching cannot be performed sufficiently. If the stretching speed is more than 5.0 times, the polyethylene terephthalate may not be stretched due to the nature of the material.

The filament that has passed through the stretching roller 6 passes through a texturing unit 7 having a texturing nozzle for imparting a bulking property. At this time, a heating fluid of 150 to 270° C. is sprayed in the texturing unit 7 with a pressure of 3 to 10 kg/cm$^2$ to thereby cause the filament to crimp irregularly in three dimensions.

In this case, the temperature of the heating fluid is preferably 150 to 250° C., and when the temperature is lower than 150° C., the texturing effect is lowered. If the temperature exceeds 250° C., the filament is damaged. In addition, the pressure of the heating fluid is preferably 3 to 10 kg/cm$^2$, and if less than 3 kg/cm$^2$, the texturing effect is lowered, and if it exceeds 10 kg/cm$^2$, the filament is damaged.

The filament that has passed through the texturing unit 7 is cooled through the cooling drum 8 disposed at the lower end of the texturing nozzle.

The cooled raw yarn is passed through the relax roller 9 at a speed of 0.65 to 0.95 times the drawing roller speed to give an over feed rate of 5 to 35%. At this time, if the speed of the relax roller is less than 0.65 times the speed of the stretching roller, the paper is not wound. If the speed exceeds 0.95 times, the bulkiness is reduced, the shrinkage of the yarn is significantly increased, and high tension is caused, thereby interfering with the job. The yarn passed through the relax roller 9 passes through a collator 10. In this part, a slight twist and a knot are given at a pressure of 2.0 to 8.0 kg/m2 in order to improve the rolling speed of the yarn, and it is given in the range of 0 to 40 times/m, preferably 10 to 25 times/m. In case of exceeding 40 times of being interlaced, even after dyeing and post-processing, the interlaced state is maintained and the appearance of the carpet is damaged. The yarn passed through the collator 10 is wound in the final winder 11.

The speed of the winder is preferably adjusted so that the tension of the yarn usually ranges from 50 to 350g. At this time, if the tension is less than 50g in the winder, the winding is impossible, and if it exceeds 350g, the bulkiness is decreased and the contraction of the yarn is largely caused and the high tension is generated.

The polyethylene terephthalate multifilament prepared as described above preferably has a weight average molecular weight of 50,000 to 70,000, more preferably 53,000 to 70000, even more preferably 60,000 to 70,000. When a carpet thermoforming process is carried out using a bulked continuous filament having a weight average molecular weight of less than 50,000, the filaments of the carpet pile are insufficient in physical properties to thereby be damaged. These damages cause the original pile to become only 20~30% of the original height of the pile, and the cushion feeling and the volume feeling of the carpet are significantly lowered, and the pressing mark and the color feeling are also deteriorated. On the other hand, when the weight average molecular weight exceeds 70,000, there arises a problem that the spinning processability is lowered.

The polyethylene terephthalate multifilament preferably has a molecular weight distribution (PDI) of 1.6 to 2.0. When the molecular weight distribution is wide, the number of low molecular weight substances having a lower molecular weight than the critical molecular weight (Mc) is increased, which causes pyrolysis in the spinning process, resulting in deterioration of the physical properties of the fiber.

In addition, it is preferable that the content of carboxyl end group (CEG), which causes pyrolysis, is 20 meq/kg or less and the content of diethylene glycol (DEG) is 1.5 wt % or less. In this case, the generation of pyrolysis due to the heating and pressing processes in the production of car mats in the future can be reduced, and the problem of deterioration of the physical properties of the fibers can be prevented.

When having such physical properties, the elastic recovery rate, which is inherent property of the polymer, can be improved.

On the other hand, the automobile carpet is subjected to a thermoforming process when it is manufactured, and it has been confirmed how much the final polyethylene terephthalate bulked continuous filament is crushed only after such a thermoforming process.

However, in the present invention, the recovery rate of the carpet pile can be measured and predicted through the filament by introducing a concept of an elastic modulus that measures the physical properties of the bulked continuous filament is measured using dynamic mechanical analysis (DMA), which is an analysis method of imparting stress while applying heat without applying conventional fiber properties such as strength and elongation.

At this time, the elastic modulus of the polyethylene terephthalate bulked continuous filament may be 1.00E+07 to 5.00E+09Pa, preferably 2.0E+07 to 6.0E +08Pa, more preferably 3.5E+07 to 1.5E+08Pa at a temperature range of 10 to 200° C. In addition, the elastic modulus of the polyethylene terephthalate bulked continuous filament of 1000/128 d/f can be 5.00E+07 to 3.50E+08Pa in the temperature range of 25-180° C. It can be expected that the recovery rate of the carpet pile is improved from the elastic modulus of the filament.

Figure 3:
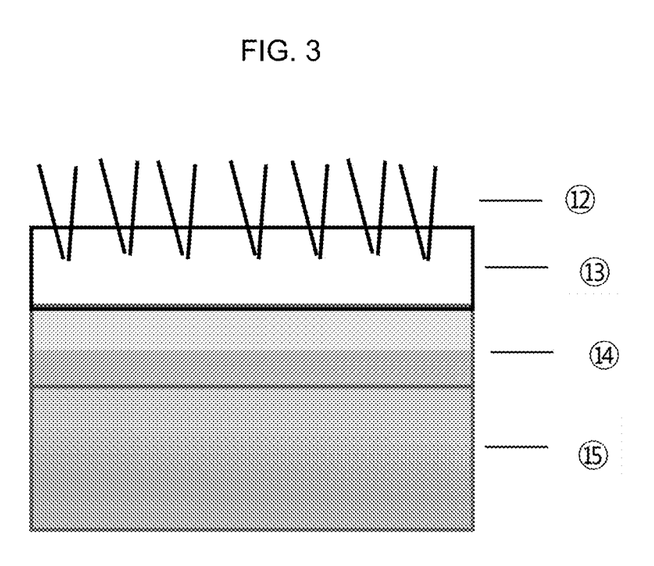
FIG. 3 is a schematic view of a tufted carpet according to an example of the present invention.

As described above, the polyethylene terephthalate multifilament prepared according to the present invention is manufactured as a carpet for automobiles through a post-process. Carpets made from the BCF yarns of the present invention can be prepared in any manner known to those skilled in the art. FIG. 3 shows a specific example of a tufted carpet for automobiles according to the present invention. The carpet has a face yarn 12 supported by a first base foil 13. At this time, the first base foil 13 is referred to as a backing layer, and the layer formed of the face yarn 12 is referred to as a pile layer. The face yarn 12, which is the outermost layer where the consumer feels the visual sensation by the eye, is formed of BCF yarn. The first base foil 13 is made of polyester or polyolefin and preferably has a spunbond or fabric shape of 90 to 150 gsm. Also, the pile layer including the face yarn 12 preferably has a weight of 180 to 700 gsm. Adjacent to the first base foil 13 is a coating layer 14 that fixes the face yarn 12, which is a suitable material conventionally used in the art, such as latex or acrylic. Finally, the carpet is subjected to a secondary coating 15 to provide sound insulation or sound absorption performance in order to ensure quietness in the automobile. It is also possible to apply 300 to 5000 gsm of PE or EVA or to attach a sound-absorbing nonwoven fabric.

By manufacturing the automobile carpet using the polyethylene terephthalate filament as described above, the carpet of the present invention can have an elastic recovery rate of 35% or more. As described above, the elastic recovery rate is improved by 35% or more, preferably 45% or more from the conventional 20 to 30% level, so that appearance quality such as cushion feeling and volume feeling can be improved. At this time, the elastic recovery rate can be calculated by the following formula.

Elasticity recovery rate=Height of filament pile (pile layer) after thermoforming a carpet for automobiles/Height of filament pile (pile layer) before thermoforming the carpet for automobiles Hereinafter, the present invention will be described in detail with reference to examples. However, the following examples are illustrative of the present invention, and the present invention is not limited by the following examples.

Examples 1-1 to 3-1

The polyethylene terephthalate polymer is subjected to solid phase polymerization to increase the molecular weight of the liquid polymer. During the process of solid phase polymerization in general, the batch solid phase polymerizer was used to dry for 4 hours at 140° C. under vacuum condition. The temperature was raised from 235° C. to 245° C. for 4 hours to 6 hours until reaching the final target viscosity. In addition, 30 wt % of carbon black was added to the polyethylene terephthalate polymer and solid phase polymerization was carried out at a temperature lower than the solid-state polymerization temperature condition of the polyethylene terephthalate polymer. Solid-state polymerization was carried out until the final aimed weight average molecular weight, respectively, to prepare a masterbatch for coloring.

The polyethylene terephthalate polymer produced through the spinneret having 128 holes and a Y-shaped cross-section is melt-spun at 290° C. The polymer exiting the spinneret is cooled by cooling air at 20° C. at the bottom of the nozzle at 0.5 m/s, and then passes through the emulsion feeder. The yarn to which the emulsion has been applied passes through a feed roller maintained at a temperature of 90° C. at a speed of 598 m/min and then stretched at a rate of 2,840 m/min at 190° C. on the stretching roller. The yarn passed through the stretching roller passes the texturing nozzle and is given a crimp. At this time, the hot air temperature is 200° C., the pressure is 7 kg/cm2, and the back pressure is 5 kg/cm2. Thereafter, the yarn was cooled at the outlet of the texturing nozzle, and relaxed by about 21% after passing the relax roller at 2250 m/min. After being interlaced at a pressure of 4.0 kg/m2, it is wound in a winding machine to thereby prepare a polyethylene terephthalate BCF yarn. Also, a carpet was produced using the polyethylene terephthalate BCF yarn.

At this time, the intrinsic viscosity, the weight average molecular weight, the molecular weight distribution, and the content of CEG and DEG of the yarn, and the weight average molecular weight, molecular weight distribution and DEG content of the master batch polymer for coloring were adjusted as shown in Table 1 below.

Comparative examples 1 and 2

Except that the intrinsic viscosity, weight average molecular weight, molecular weight distribution, and CEG and DEG content of the yarn and the weight average molecular weight, molecular weight distribution and DEG content of the master batch polymer for coloring were adjusted as described in the following Table 1, polyethylene terephthalate BCF yarn and carpet were prepared, respectively, through the same process as in example 1-1.

Experimental Example

1) Weight average molecular weight, molecular weight distribution and content of low molecular weight substances Yarns and the master batches for coloring were respectively dissolved in hexafluoroisopropanol (HFIP), and a 0.1 wt % solution of ortho-chlorophenol (OCP) was subjected to Gel Permeation Chromatography to measure the content of low molecular weight substances, the number average molecular weight and the weight average molecular weight, then the result was expressed as a relative value of the weight average molecular weight to the number average molecular weight.

2) CEG and DEG Content

In the case of the carboxyl end groups (CEG) of the master batches for coloring and yarns, 0.2 g of a sample was poured in a 50 mL Erlenmeyer flask, according to ASTM D 664 and D 4094, and 20 mL of benzyl alcohol was added, then the sample was completely dissolved by heating up to 180° C. and maintaining the temperature for 5 minutes by using a hot plate, then it was cooled to 160° C., and 5-6 drops of phenol phthalene were added when reaching 135° C., then titrated with 0.02 N KOH to thereby calculate the CEG content (COOH million equiv./Kg of sample) by the following equation 1 at the optimum point from colorless to pink.

$$CEG=(A-B)\times 20\times 1/W \qquad \text{Equation 1}$$

Herein, A is the amount of KOH consumed in the titration of the sample (m L), B is the amount of KOH consumed in the titration of the blank sample (mL), and W is the weight (g) of the sample.

The sample 1 g of the content of diethylene glycol (DEG, Diethylene Glycol) was put into a 50-mL container, and 3 mL of monoethanolamine was added. The sample was heated with a hot plate to completely dissolve the sample. And it was cooled to 100° C. and 0.005 g of 6-hexanediol was dissolved in 20 mL of methanol, then 10 g of terephthalic acid was added to neutralize the solution. The resulting neutralized solution was filtered using a funnel and a filter paper, and the filtrate was subjected to gas chromatography to measure the DEG content (wt %). The GC analysis was carried out using a Shimadzu GC analyzer and according to the Shimadzu GC manual.

3) Elastic Modulus

Elastic modulus concept that measures physical properties of bulked continuous filaments was introduced using DMA (Dynamic Mechanical Analysis), which is an analytical method that gives stress while applying heat without applying conventional fiber properties such as strength, elongation etc. And the result is shown in Table 1, whereby the recovery rate of carpet piles for automobiles can be measured and predicted.

Figure 4:
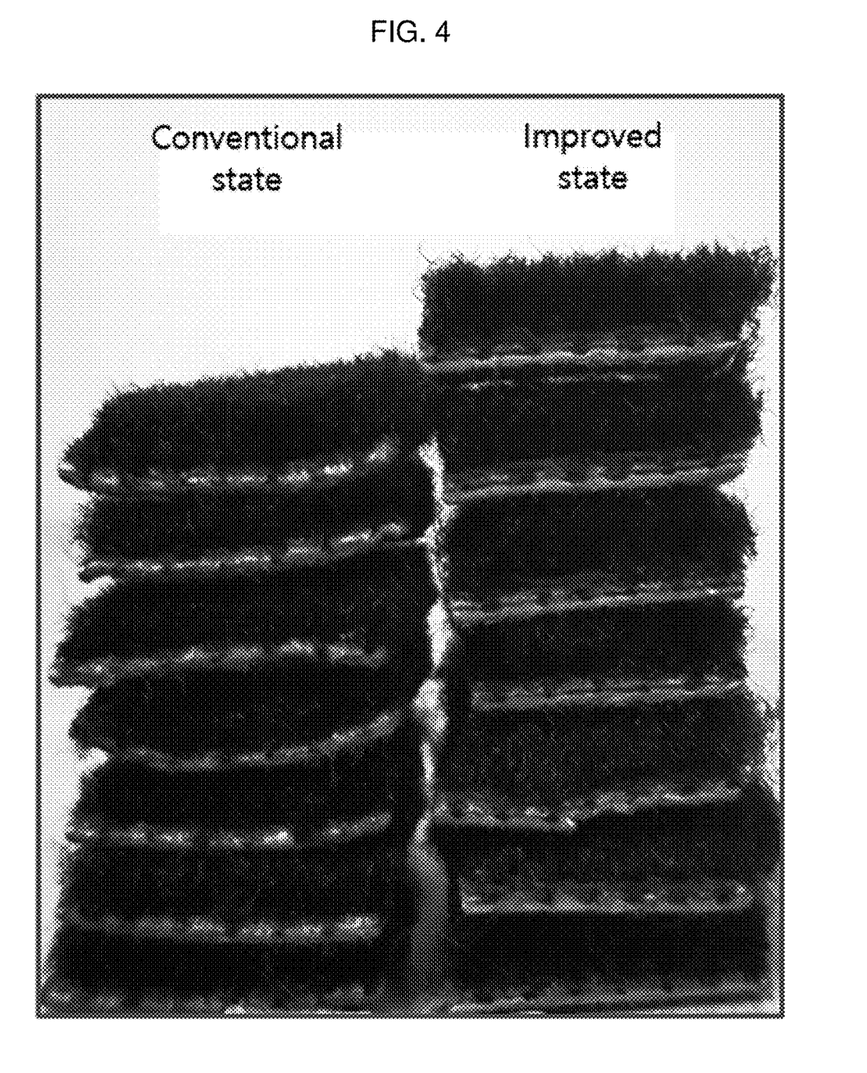
FIG. 4 shows a state after thermoforming a carpet for automobiles according to an example and a comparative example.

Further, referring to FIG. 4, it can be confirmed that the carpet for automobiles, made in accordance with Comparative Example 1, was damaged due to lack of physical

TABLE 1

| Division | Property | Example 1-1 | Example 1-2 | Example 2-1 | Example 2-2 | Example 3-1 | Example 3-2 | Comparative example 1 | Comparative example 2 |
|---|---|---|---|---|---|---|---|---|---|
| Filament | Elastic modulus (Pa, 140° C.) | 4.23E+07 | 3.12E+07 | 8.90E+07 | 6.98E+07 | 1.83E+08 | 1.36E+08 | 9.80E+06 | 9.70E+06 |
| | Elastic modulus (Pa, 160° C.) | 3.68E+07 | 2.61E+07 | 7.89E+07 | 6.20E+07 | 1.25E+08 | 0.94E+08 | 8.60E+06 | 8.40E+06 |
| | Elastic recovery rate (%) | 46 | 38 | 53 | 45 | 58 | 49 | 28 | 28 |
| | Weight average molecular weight | 53,000 | 53,000 | 61,000 | 61,000 | 68,500 | 68,500 | 41,000 | 41,900 |
| | Molecular weight distribution (pdi) | 1.86 | 1.86 | 1.85 | 1.85 | 1.83 | 1.83 | 1.91 | 1.89 |
| | CEG (meq/kr) | 15 | 15 | 13 | 13 | 9 | 9 | 15 | 20 |
| | DEG (wt %) | 1.2 | 1.2 | 1 | 1 | 0.9 | 0.9 | 1.2 | 1.6 |
| Master batch polymer (Content: 4 wt % based on the total weight of the filament | Weight average molecular weight | 51,500 | 29,700 | 57,200 | 29,700 | 65,300 | 29,700 | 29,700 | 31,200 |
| | Molecular weight distribution (pdi) | 1.53 | 1.66 | 1.52 | 1.66 | 1.48 | 1.66 | 1.66 | 1.6 |
| | DEG (wt %) | 0.97 | 1.7 | 0.89 | 1.7 | 0.66 | 1.7 | 1.7 | 1.6 |
| | Content of low molecular weight substances in PET (wt %) | 0.41 | 9.7 | 0.36 | 9.7 | 0.29 | 9.7 | 9.7 | 9.5 |
| | TPA content (ppm) | 13.7 | 43.8 | 11.3 | 43.8 | 8.5 | 43.8 | 43.8 | 41.6 |
| | MHET content (ppm) | 4.9 | 76.7 | 0 | 76.7 | 0 | 76.7 | 76.7 | 73.5 |
| | BHET content (ppm) | 0 | 27.2 | 0 | 27.2 | 0 | 27.2 | 27.2 | 25.6 |

Figure 5:
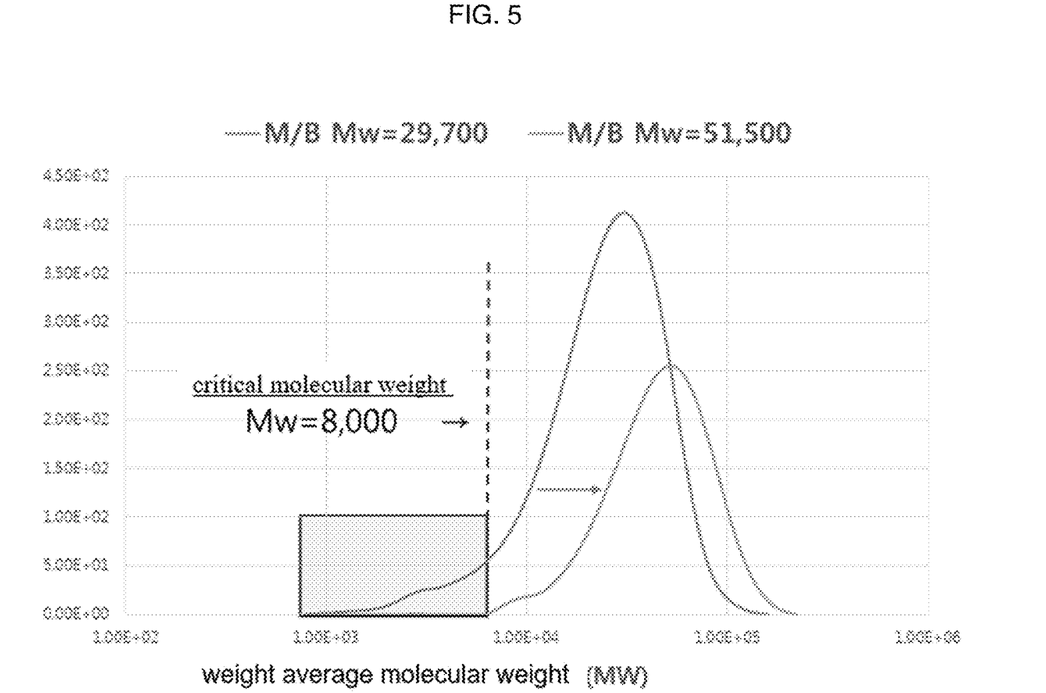
FIG. 5 is a graph showing a result of a gel permeation chromatography of a master batch according to an example and a comparative example.

It can be seen that the carpet for automobiles, manufactured using the polyethylene terephthalate BCF produced according to the example, has an increased elastic recovery rate as compared with the comparative example. In particular, when the molecular weight of the master batch is increased as in Examples 1-1, 2-1 and 3-1, it can be seen that the low molecular weight substances and unreacted substances in the polyethylene terephthalate (See FIG. 5). Specifically, it can be seen that the content of the low molecular weight substances in the master batches of Examples 1-1, 2-1 and 3-1 was drastically reduced as compared with the comparative example, and terephthalic acid (TPA), which is an unreacted material that acts as a foreign substance in the spinning process, was reduced by about 69%, MHET (MonohydroxyEthyl Terephthalate) and BHET (Bis (2-HydroxytEthyl Terephthalate) were mostly removed. Because of this, when the weight average molecular weight of the filament and the masterbatch polymer increases, the elastic modulus of the filament increases up to about 20 times at high temperature, and the elastic recovery rate of automobile carpet is improved from 28% to 58%. In the case of Comparative Examples 1 and 2, as the master batch contains a large number of low molecular weight substances having a molecular weight of less than the critical molecular weight, the properties of the filaments were deteriorated. Also, even though the weight average molecular weight of the filament and masterbatch polymer of Comparative Example 2 was higher than that of Comparative Example 1, it was found that there was no significant difference in elastic modulus value due to the heat sensitive property with a relatively high CEG or DEG content.

properties, and the carpet for automobiles, made according to the Example, exhibited excellent cushioning feeling and volume feeling.

Therefore, when the automobile carpet is manufactured using the BCF produced according to the present invention, excellent cushioning and volume feeling can be exhibited.

While the present invention has been particularly shown and described with reference to exemplary embodiments thereof, it will be understood by those skilled in the art that various changes and modifications may be made without departing from the spirit and scope of the invention as defined in the appended claims. It will be understood by those skilled in the art that various changes in form and details may be made therein without departing from the spirit and scope of the invention.

Accordingly, the technical scope of the present invention should not be limited to the contents described in the detailed description of the specification, but should be defined by the claims.

| Description of Symbols | |
|---|---|
| 1: spinneret | 2: filament |
| 3: cooling zone | 4: finishing applicator |
| 5: feed roller | 6: stretching roller |
| 7: texturing unit | 8: Cooling Drum |
| 9: relax roller | 10: collator |
| 11: final winder | 12: face yarn(BCF) |
| 13: first base foil | 14: coating layer |
| 15: second coating layer | |

What is claimed is:

1. A polyethylene terephthalate bulked continuous filament made from a polyethylene terephthalate chip and a polyethylene terephthalate master batch chip for coloring comprising inorganic dyes or organic dyes,
    wherein the polyethylene terephthalate master batch is produced and has a lower weight average molecular weight compared to the polyethylene terephthalate chip,
    wherein the master batch chip for coloring is produced by injecting the inorganic dyes or organic dyes with a base polyethylene terephthalate chip and extruding the inorganic dyes or organic dyes and the base chip,
    wherein the polyethylene terephthalate bulked continuous filament has an elastic modulus in a dynamic mechanical analysis (DMA) of between 1.0E+07 and 5.0E+09 Pa in a temperature range of 10° C. to 200° C.,
    wherein a weight average molecular weight of the polyethylene terephthalate bulked continuous filament is 50,000 to 70,000, a molecular weight distribution (PDI) of the polyethylene terephthalate bulked continuous filament is 1.6 to 2.0,
    wherein a diethylene glycol (DEG) content of the polyethylene terephthalate bulked continuous filament is equal to or less than 1.2 wt %, and
    wherein a diameter of the polyethylene terephthalate bulked continuous filament is 6 to 20 dpf.

2. The polyethylene terephthalate bulked continuous filament of claim 1, wherein the polyethylene terephthalate master batch chip comprises about 150 ppm or less of terephthalic acid, monohydroxyethyl terephthatate, and bis (2-hydroxyethyl terephthalate).

3. The polyethylene terephthalate bulked continuous filament of claim 1, wherein the polyethylene terephthalate master batch has a weight average molecular weight of 30,000 to 70,000.

4. The polyethylene terephthalate bulked continuous filament of claim 1, wherein a content of low molecular weight substances having a weight average molecular weight of 8,000 or less in a polymer of the polyethylene terephthalate master batch chip for coloring is 10 wt % or less.

5. The polyethylene terephthalate bulked continuous filament of claim 1, wherein a content of low molecular weight substances having a weight average molecular weight of 8,000 or less in a polymer of the polyethylene terephthalate master batch chip for coloring is 5 wt % or less.

6. The polyethylene terephthalate bulked continuous filament of claim 1, wherein the polyethylene terephthalate master batch chip is prepared by solid phase polymerization.

7. The polyethylene terephthalate bulked continuous filament of claim 6, wherein the solid phase polymerization is carried out under vacuum conditions at 110 to 170° C. for 4 to 6 hours, and the temperature is raised from 235 to 255° C. for 4 to 6 hours.

8. The polyethylene terephthalate bulked continuous filament of claim 1, wherein the master batch chip for coloring includes carbon black as a dye in an amount of 1 to 40 wt % based on a total weight of the polyethylene terephthalate master batch chip for coloring.

9. The polyethylene terephthalate bulked continuous filament of claim 1, which is prepared by a method comprising melt-spinning the polyethyleneterephthalate chip and the coloring polyethylene terephthalate master batch chip together.

10. The polyethylene terephthalate bulked continuous filament of claim 9, wherein the method further comprises cooling the yarn with air at a speed of 0.2 to 1.0 m/sec.

11. The polyethylene terephthalate bulked continuous filament of claim 10, wherein the method further comprises oiling with a neat type emulsion or a water-soluble emulsion.

12. The polyethylene terephthalate bulked continuous filament of claim 11, wherein the method further comprises a step of feeding the filament to a stretching roller at a speed of 300 to 1,200 m/min.

13. The polyethylene terephthalate bulked continuous filament of claim 11, wherein the polyethylene terephthalate bulked continuous filament has an elastic modulus in a dynamic mechanical analysis (DMA) of between 2.0E+07 and 6.0E+08 Pa in a temperature range of 10° C. to 200° C.

14. A tufted carpet, comprising:
    a pile layer including the polyethylene terephthalate bulked continuous filament of claim 1; and
    at least one backing layer,
    wherein an elastic recovery rate, which is a height of the pile layer after thermoforming to a height of the pile layer before thermoforming, is equal to or greater than 35%.

15. The tufted carpet of claim 14, wherein the bulked continuous filament has a fineness of 700 to 1500 denier.

16. The tufted carpet of claim 14, wherein the pile layer weighs 180 gsm to 700 gsm.

17. The tufted carpet of claim 14, wherein the elastic recovery rate is equal to or greater than 45%.

18. The tufted carpet of claim 14, wherein the at least one backing layer is made of polyester or polyolefin and has a spunbond or fabric shape of 90 to 150 gsm.

19. A polyethylene terephthalate bulked continuous filament made from a polyethylene terephthalate chip and a polyethylene terephthalate master batch chip for coloring comprising inorganic dyes or organic dyes,
    wherein the colored polyethylene terephthalate bulked continuous filament has an elastic modulus in a dynamic mechanical analysis (DMA) of between 1.0E+07 and 5.0E+09 Pa in a temperature range of 10° C. to 200° C.,
    wherein the polyethylene terephthalate comprises units derived from ethylene glycol and terephthalic acid and one or more ester-forming components selected from the group consisting of 1,3-propanediol, 1,4-butanediol, 1,6-hexanediol, isophthalic acid, hexahydroterephthalic acid, stilbene dicarboxylic acid, bibenzoic acid, adipic acid, sebacic acid, and azelaic acid,
    wherein a weight average molecular weight of the polyethylene terephthalate bulked continuous filament is 50,000 to 70,000,
    wherein a molecular weight distribution (PDI) of the polyethylene terephthalate bulked continuous filament is 1.6 to 2.0,
    wherein a diethylene glycol (DEG) content of the polyethylene terephthalate bulked continuous filament is equal to or less than 1.2 wt %, and
    wherein a diameter of the polyethylene terephthalate bulked continuous filament is 6 to 20 dpf.

* * * * *